Sept. 30, 1969  J. E. ANDERSON ET AL  3,469,948
PADDLE-TYPE POLYMERIZATION REACTOR
Filed Aug. 24, 1966  2 Sheets-Sheet 1

JOHN E. ANDERSON
FRANCIS H. HOLLOWAY
WILLIAM A. STEEN
INVENTORS

ATTORNEY

Sept. 30, 1969　　J. E. ANDERSON ET AL　　3,469,948
PADDLE-TYPE POLYMERIZATION REACTOR Filed Aug. 24, 1966　　　　　　　　　　　　　　　2 Sheets-Sheet 2

JOHN E. ANDERSON
FRANCIS H. HOLLOWAY
WILLIAM A. STEEN
　　　　INVENTORS

BY *Richard W. Dannells, Jr.*

ATTORNEY

United States Patent Office 3,469,948
Patented Sept. 30, 1969

3,469,948
PADDLE-TYPE POLYMERIZATION REACTOR
John E. Anderson, Oakland, and Francis H. Holloway, Hackensack, N.J., and William A. Steen, Odessa, Tex., assignors to Dart Industries Inc., Los Angeles, Calif., a corporation of Delaware
Filed Aug. 24, 1966, Ser. No. 574,765
Int. Cl. B01j *1/14*
U.S. Cl. 23—285                                          8 Claims

ABSTRACT OF THE DISCLOSURE

The polymerization reactor comprises a plurality of paddle blades positioned adjacent the reactor's inner surface and a plurality of intermediate paddle blades connected to support members spaced longitudinally along a driven shaft coaxially rotatably mounted within the shell of the reactor and positioned between the shaft and the inner surface. Purge gas inlet and pulsing means are provided in the reactor and/or on the product outlet to pulse a purge gas against the inner surface of the ends of the reactor to prevent product accumulation thereon and to aid in product removal.

---

The present invention relates to polymerization reactors and more particularly to reactors having paddle-type agitators.

It is known to use vessels containing paddle-type agitators in the drying, cooling, reacting, and blending of solid materials. Specifically, vessels having paddle-type agitators have been used in polymerization reactions which require intimate mixing of at least two phases. However, the commercially available vessels containing the paddle-type agitators have not been entirely successful as polymerization reactors.

The basic disadvantage of the paddle agitated reactor is that the agitation is insufficient to obtain high polymerization reaction rates. Another disadvantage of this reactor is that the polymerization reaction product is non-homogeneous which results in polymers having poor physical properties. Another disadvantage is that non-uniform temperatures are produced in the polymer bed of the reactor which cause localized hot spots. These hot spots in turn cause solid polymer masses to build-up in the static areas in the reactor, i.e., on the reactor heads. The accumulated material ultimately flakes off causing product contamination. Still another disadvantage is that the polymers tend to bridge or plug the discharge lines. This in turn increases the level of the polymer bed in the reactor and eventually leads to a complete reactor shut-down.

Accordingly, a general object of the present invention is to provide a polymerization reactor which overcomes the foregoing disadvantages.

A specific object of this invention is to provide a polymerization reactor having improved agitation in order to increase the reaction rate, improve the homogeneity of the reactor products and produce a uniform temperature throughout the polymer bed.

A further specific object of this invention is to provide an apparatus to prevent a build-up of reaction products in the reactor.

A still further specific object of this invention is to provide an apparatus to prevent bridging or plugging of the reactor discharge line.

The present invention will be more readily understood and further objects and advantages thereof will be more readily apparent from the following description when read in conjunction with the accompanying drawings, in which.

Figure 1:
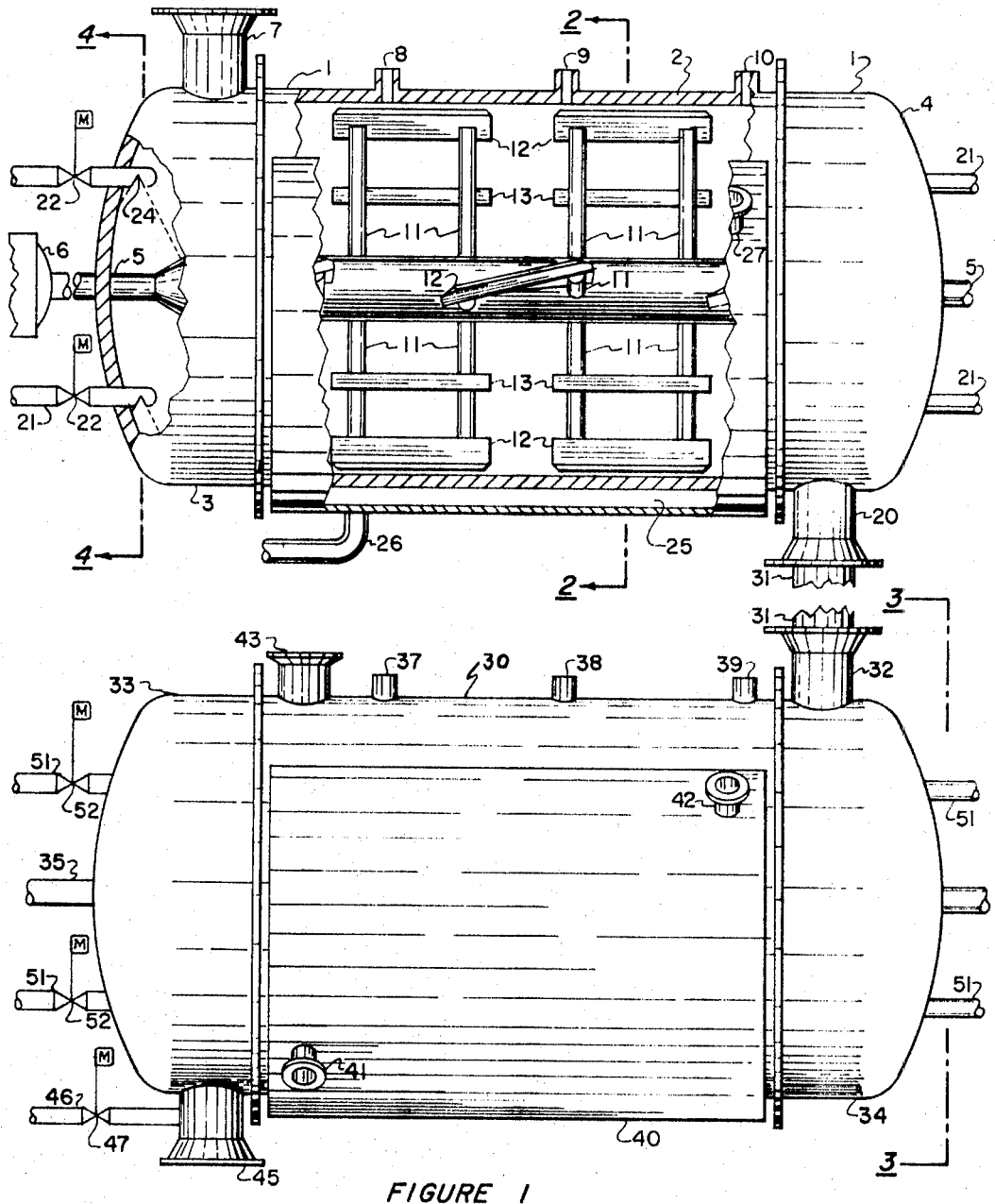
FIG. 1 is an elevation view of an embodiment of two polymerization reactors in a two-stage reactor system constructed in accordance with the present invention and includes a cut-away view of the internals of one of the reactors.

The present invention provides, in a polymerization reactor including a cylindrical shell having a substantially horizontal axis and provided with closed end portions, a driven shaft coaxially rotatably mounted in the shell, a plurality of paddle blades longitudinally spaced along the inner surface of the shell positioned adjacent thereto, a plurality of support members connected between the shaft and the paddle blades, an inlet located at one of the end portions for introducing reactants into the reactor and an outlet located at the other of the end portions for discharging the resulting reaction products from the reactor, the combination comprising a plurality of intermediate paddle blades connected to the support members and positioned between the shaft and the inner surface of the shell.

In one embodiment of the present invention, purge gas inlet means are disposed in at least one of the end portions of the reactor of this invention for introducing a purge gas into the reactor and pulsing means operatively connected to said purge gas inlet means for pulsing the purge gas against the inner surface of at least one of said end portions to prevent accumulation of reaction products thereon.

In another embodiment of this invention, purge gas inlet means are attached to the outlet of this reactor for introducing a purge gas into said outlet and pulsing means operatively connected to the purge gas inlet means for pulsing a purge gas into the outlet for aiding in the removal of the reaction products from the reactor.

A more specific embodiment of the invention provides, in a polymerization reactor for contacting a solid phase with a fluid phase including an elongated hollow cylindrical shell having a substantially horizontal axis and provided with closed end portions, the combination comprising inlet means for introducing the solid phase into the reactor located at one of the closed end portions; means for introducing the fluid phase into the reactor; agitator means for bringing the solid phase and the fluid phase in the reactor into intimate contact, said agitator means consisting of a plurality of mixing elements longitudinally spaced along the inner surface of the shell, each of said mixing elements in one set of elements positioned adjacent to the inner surface of the shell and each of the mixing elements in another set of elements positioned between the axis of the shell and the inner surface; and outlet means for discharging the resulting reaction products from the reactor located at the other of the closed end portions.

Referring now to the drawings, there is shown various elevation views of a two-stage polymerization reactor system embodying the elements of the apparatus of the present invention. The advantage of the two-stage reactor system over a single stage reactor is that it permits longer residence time, greater ease in heat removal and greater flexibility of operation. These advantages will be more apparent from the following discussion of the drawings.

Reactor 1 is illustrated in FIG. 1 and comprises shell 2 having a horizontal axis and heads 3 and 4. Shaft 5 is coaxially and rotatably mounted in shell 2 and is driven by motor 6. Inlet 7 is located in head 3 and is used to introduce the solid materials into the reactor. The solid materials include the catalyst and the polymer or mixture of polymers to be reacted.

Entry ports 8, 9 and 10 are mounted on shell 2 and are used for introducing gases into the reactor. Gaseous monomers are added to the reactor through at least one and preferably all of the entry ports 8, 9 and 10. Inert gas can be added to the reactor through one or more of the entry ports. Preferably a mixture of monomers and inert gas is added through each of the entry ports. Although any inert gas can be used, nitrogen is preferred. The inert gas serves to assure that monomers are homogeneously dispersed throughout the reactor space above the polymer bed. The inert gas also helps to moderate the polymerization reaction by diluting the concentration of monomers in the reactor. It is apparent that any number of entry ports greater than one can be used to introduce the gases into the reactor to insure proper mixing. Preferably the entry ports are substantially equally spaced along the length of shell 2.

Support members 11 are mounted on shaft 5. They are longitudinally spaced along and extend radially outward from shaft 5. Paddle blades 12 are attached to the distal ends of support members 11 and are positioned so as to maintain very close tolerance between the outside edge of blades 12 and the inner surface of shell 2. A tolerance in the range of $\frac{1}{16}$ to $\frac{1}{4}$ of an inch has been found to be satisfactory. Intermediate paddle blades 13 are attached to support members 11 between shaft 5 and paddle blades 12.

FIG. 1 shows that one outer blade, paddle blade 12, and one intermediate blade, paddle blade 13, are attached to a pair of support members 11 forming a paddle blade unit. It is obvious to one skilled in the art that this unit can comprise one or more support members. Specifically the paddle blade units, as shown in FIG. 1, comprise a pair of support members 11 perpendicularly mounted on shaft 5, an outer rectangular paddle blade 12 attached to support members 11 between its ends with a portion of the width of the blade adjacent the inner surface of shell 2 overlapping support member 11, and an intermediate rectangular paddle blade 13 attached halfway between shaft 5 and the inner surface of shell 2. The overlapping portion of blade 12 is pitched to give the material inward movement toward shaft 5 as the agitator assembly rotates. The paddle blades 12 and 13 can have any reasonable length to width ratio, i.e., in the range of 1:1 to 12:1.

The inner portion of intermediate blades 13 adjacent to shaft 5 can be pitched to give the material movement away from shaft 5. Thus, by having the inner portion of blade 13 and the outer or overlapping portion of blade 12 both pitched away from support member 11, the material is given counterflow and a more thorough mixing. The degree of pitch is not critical so long as the desired objectives are obtained. For example, a suitable range of pitch is between 2 and 15° away from the axis of support member 11. Preferably, blade 12 is pitched at a greater angle than blade 13. This allows for a portion of the material to move inward against shaft 5 as another portion is moved outward against the inner surface of shell 2.

Figure 2:
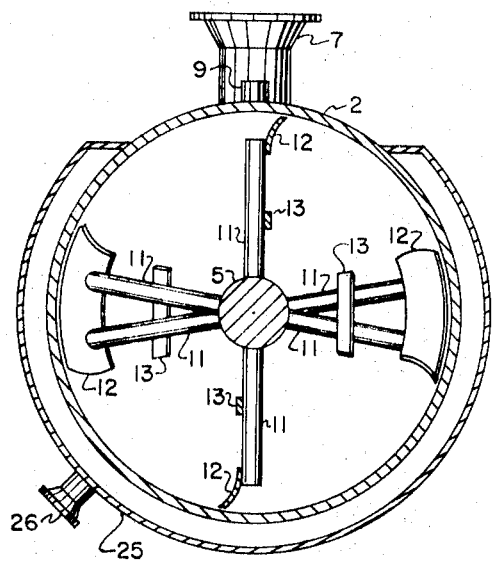
FIG. 2 is a sectional elevation view of one of the reactors, view 2—2 of FIG. 1.

FIG. 2 is sectional view 2—2 of FIG. 1 showing the four quadrants formed by the paddle blade units. In each quadrant, the units are equally and longitudinally spaced along shaft 5. This spacing permits the reactants to flow toward shaft 5 between the paddle blade units. The plane through the two paddle blade units which are shown in FIG. 2 along the vertical axis of shell 2 bisects reactor 1. The other two paddle blade units which are shown substantially along the horizontal axis of shell 2 are angularly displaced with respect to that axis. This displacement is designed to give forward flow of material from inlet 7 to outlet 20 maintained in head 3. The displaced paddle blade units are shown to be about 7½° above and below the horizontal axis. This angle of displacement gives the optimum forward flow to the material. However, any reasonable angle of displacement will do so long as the material is given the desired forward motion. For example, a suitable range of angular displacement is between 2° and 15° above and below the shaft. The overall effect of the complete agitator assembly of paddle blade units is to give the desired intimate contact between the solid and gas phases and to give the desired forward movement to the reactants.

The product resulting from a reaction conducted in the reactor of the present invention is discharged through outlet 20. In the case of a single stage reactor system, the reaction product is removed for product recovery. However, in this specific embodiment of the invention, the reaction product is further reacted in the second stage reactor.

Four purge gas inlets 21 are mounted in heads 3 and 4. These purge gas inlets are used to pulse a purge gas such as nitrogen or other inert gas by means of solenoid valve 22 against the inner surface of each of the heads. Although an inert gas is preferred, a reactive olefin gas can also be used for purging purposes. The purge gas passes through V-notched opening 24 formed in each of the four purge gas inlets 21 for each head as shown in reactor 1 of FIG. 1. Openings 24 direct jets of inert gas against the inner walls of heads 3 and 4 to dislodge any accumulations of polymer. Without this modification, polymer accumulates in the heads where little or no agitation takes place and then breaks off causing plugs in the lines and contamination of the product. The build-up of material is very gradual. Thus, periodic purging is all that is required. Solenoid valve 22 responds at preset time intervals to give the desired pulse to the purge gas.

Cooling jacket 25 is mounted on shell 2 and fitted with cooling medium inlet 26 and outlet 27. Suitable cooling media include water, brine solutions, liquified petroleum gas and other refrigerants. Jacket 25 aids in removing the exothermic heat of the polymerization reaction.

Reactor 1 is connected in series to reactor 30, as shown, by means of line 31 connected between outlet 20 of reactor 1 and inlet 32 of reactor 30. Reactor 30 has essentially the same elements as reactor 1, including heads 33 and 34, shaft 35, and entry ports 37, 38 and 39, cooling jacket 40, cooling medium inlet 41 and cooling medium outlet 42. Unlike reactor 1, reactor 30 is equipped with gas outlet 43 to remove unreacted gas from the second stage reactor. Gas outlet 43 greatly reduces the amount of entrained gases being removed with the reaction products through outlet 45 in head 33. This gas can be filtered by conventional means such as in a bag filter and recycled to entry ports 8, 9 and 10. It can also be removed from the system for gas recovery. Either the same or different monomers are added through entry ports 37, 38 and 39 that are added through entry ports 8, 9 and 10. This gives one the flexibility of producing a whole series of different polymer products.

After the partially reacted material from reactor 1 is subjected to additional residence time in reactor 30 to complete the polymerization, it is removed therefrom through outlet 45. The resulting reaction products are then passed through conventional product recovery steps, not shown.

The height of the polymer bed in each of reactors 1 and 30 is controlled by an adjustable weir, not shown, positioned in each of the outlet heads, heads 4 and 33. By controlling the height of bed, one controls the residence time, i.e., weight of the bed over the throughput in weight per hour, within the limits of a given reactor. These limits depend on the minimum and maximum height of bed to get good mixing.

Outlet 45 is provided with a pulse gas inlet 46 wherein purge gas is pulsed out of inlet by means of solenoid valve 47 at regular intervals. The purge gas enters outlet 45 at a velocity sufficient to prevent bridging of polymer products from the head across the outlet opening and prevents plugs in the outlet line. Reactor 30 is equipped with the purge gas inlets 51 and solenoid valves 52. The discussion above in connection with purge gas inlets 21 applies to inlet 51 as well.

Figure 3:
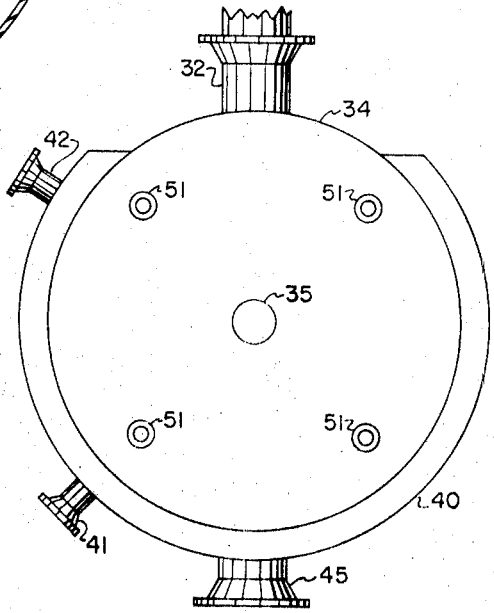
FIG. 3 is an elevation view of one of the heads of one of the reactors, view 3—3 of FIG. 1.

FIG. 3 illustrates an end view of head 34 of reactor 30, view 3—3 of FIG. 1, showing the configuration purge gas inlets 51. The purge gas inlets in each of the heads in both reactors are located as shown in FIG. 3.

Figure 4:
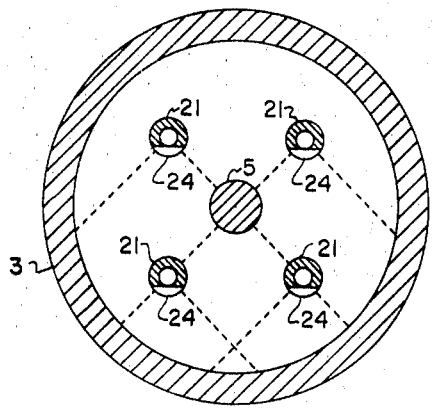
FIG. 4 is another sectional elevation view of one of the reactors, view 4—4.

FIG. 4 shows a sectional view of the head 3 of reactor 1, view 4—4 of FIG. 1. It indicates the V-notched openings 24 adjacent to the ends of purge gas inlets 21. The dotted lines represent a possible flow pattern the inert gas might take as it is pulsed through the inlets. As is shown in FIG. 1 and FIG. 4, the entire head of the reactor is contacted by the flow of inert gas.

The apparatus of the present invention can be used in many types of reactions where intimate mixing between at least two phases is required. One process to which the apparatus of this invention is particularly applicable is in the production of block copolymers or random block copolymers. In this process, a preformed alpha-olefin polymer in finely divided form containing an active catalyst is intimately contacted with at least one alpha-olefin monomer in the apparatus of this invention at temperatures in the range of 60° to 195° F. and pressures in the range of 0 to 100 p.s.i.g. The preformed alpha-olefin polymer is produced, for example, by polymerizing an alpha-olefin monomer in a hydrocarbon diluent to form a slurry. The polymerization is carried out in the presence of a suitable polymerization catalyst at a temperature in the range of 50° to 250° F. and pressures of up to 1000 p.s.i.g. A suitable polymerization catalyst is formed from a mixture of a subhalide of a metal from Groups IV$a$, V$a$ and VI$a$ of the Periodic Table and an aluminum compound containing at least one carbon to metal bond. Preferred catalysts contain titanium trichloride and an aluminum compound such as aluminum triethyl or dialkylaluminum monochloride wherein the alkyl groups contain from 1 to 10 carbon atoms. The alpha-olefin monomers used to prepare the preformed polymer or the block copolymer include ethylene, propylene, butene-1, isobutene-1, pentene-1, hexene-1 as well as branched alpha-olefins such as 3-methyl butene-1 and 4-methyl pentene-1. The volatile hydrocarbons are flashed from the preformed polymer slurry containing the active polymerization catalyst to less than 5 weight percent volatiles. The preformed polyolefin is then passed to the reactor of this invention.

A specific example indicating the preparation of a block copolymer in the apparatus of this invention is described below.

Example

A block copolymer was produced in a two-stage reactor system similar to that shown in FIG. 1. A polypropylene prepolymer having a melt flow of between 3.5 and 5 and an Izod impact strength of 0.4 to 0.5 was introduced into the first stage reactor constructed in accordance with this invention. The preformed polymer was prepared in a manner as described in the preceding paragraphs. The polymer contained an active catalyst and about 1 to 2 weight percent volatiles. The catalyst comprised titanium trichloride activated with diethylaluminum chloride. A gaseous mixture comprising a blend of ethylene and propylene and 50 to 65 mole percent nitrogen was introduced through the entry ports of both the first and second stage reactors. The partially reacted product from the first stage reactor was passed to the second stage reactor and the reaction continued.

The resulting reaction product was deashed to remove catalyst, dried and extruded. About 8 weight percent (based on the total weight of polymer produced) of ethylene was incorporated into the polypropylene polymer.

The finished block copolymer had an Izod impact strength of 2.3 ft.-lb./in. of notch as measured by ASTM D-256-56 (on an injection molded sample), a flexural stiffness of 102,000 p.s.i. as measured by ASTM D-747-63, and a low temperature brittleness of 2° C. as measured by ASTM D-746. These properties showed improvement over those of the block copolymers prepared by the paddle-type polymerization reactor without the modifications of the apparatus of this invention. In addition, the product was continuously prepared without harmful build-up of reaction products in the reactor heads or without plugs in the discharge lines.

Although only specific modes of operation of the apparatus of this invention have been described, numerous variations could be made in these modes without departing from the spirit and scope of the appended claims and are intended to be embraced thereby.

What we claim is:

1. In a polymerization reactor including a cylindrical shell having a substantially horizontal axis and provided with closed end portions; a driven shaft coaxially rotatably mounted in said shell; a plurality of paddle blades longitudinally spaced along the inner surface of said shell and positioned adjacent thereto; a plurality of support members connected between said shaft and said paddle blades; an inlet located at one of said end portions for introducing reactants into said reactor; and an outlet located at the other of said end portions for discharging the resulting reaction products from said reactor, the combination comprising a plurality of intermediate paddle blades connected to said support members and positioned between said shaft and the inner surface of said shell; purge gas inlet means disposed in at least one of said end portions for introducing a purge gas into said reactor and pulsing means operatively connected to said purge gas inlet means for pulsing said purge gas against the inner surface of at least one of said end portions to prevent the accumulation of reaction products thereon.

2. In a polymerization reactor including a cylindrical shell having a substantially horizontal axis and provided with closed end portions; a driven shaft coaxially rotatably mounted in said shell; a plurality of paddle blades longitudinally spaced along the inner surface of said shell and positioned adjacent thereto; a plurality of support members connected between said shaft and said paddle blades; an inlet located at one of said portions for introducing reactants into said reactor; and an outlet located at the other of said end portions for discharging the resulting reaction products from said reactor, the combination comprising a plurality of intermediate paddle blades connected to said support members and positioned between said shaft and the inner surface of said shell; purge gas inlet means attached to said outlet for introducing a purge gas into said outlet and pulsing means operatively connected to said purge gas inlet means for pulsing said purge gas into said outlet for aiding in the removal of the reaction products from said reactor.

3. In a polymerization reactor for contacting a solid phase with a fluid phase including an elongated hollow cylindrical shell having a substantially horizontal axis and provided with closed end portions, the combination comprising inlet means for introducing the solid phase into said reactor located at one of said closed end portions; means for introducing the fluid phase into said reactor; agitator means for bringing said solid phase and said fluid phase in said reactor into intimate contact, said agitator means consisting of a plurality of mixing elements longitudinally spaced along the inner surface of said shell, each of said mixing elements in one set of elements positioned adjacent to the inner surface of said shell and each of said mixing elements in another set of elements positioned between the axis of the shell and said inner surface; outlet means for discharging the resulting reaction products from said reactor located at the other of said closed end portions, a plurality of purge gas inlet means disposed in each of said end portions for introducing a purge gas into said reactor and pulsing means operatively connected to said purge gas inlet means for pulsing said purge gas against the inner surface of each of said end portions to prevent the accumulation of reaction products thereon.

4. In a polymerization reactor for contacting a solid phase with a fluid phase including an elongated hollow cylindrical shell having a substantially horizontal axis and provided with closed end portions, the combination comprising inlet means for introducing the solid phase into said reactor located at one of said closed end portions; means for introducing the fluid phase into said reactor; agitator means for bringing said solid phase and said fluid phase in said reactor into intimate contact, said agitator means consisting of a plurailty of mixing elements longitudinally spaced along the inner surface of said shell, each of said mixing elements in one set of elements positioned adjacent to the inner surface of said shell and each of said mixing elements in another set of elements positioned between the axis of the shell and said inner surface; outlet means for discharging the resulting reaction products from said reactor located at the other of said closed end portions, purge gas inlet means attached to said outlet means for introducing a purge gas into said outlet and pulsing means for pulsing a purge gas into said outlet means to aid in the removal of the reaction products from said reactor.

5. In a polymerization reactor for contacting a solid phase with a gas phase comprising an elongated hollow cylindrical shell having a substantially horizontal axis and provided with a head at each end thereof, and a driven shaft coaxially rotatably mounted in said shell, the improvement which comprises:
 (A) an inlet located in one of the heads for introducing the solid phase into said reactor;
 (B) at least one entry port mounted on said shell for introducing the gas phase into said reactor;
 (C) an agitator mounted on said shaft comprising
  (1) a plurality of support members longitudinally spaced along said shaft and extending radially outward therefrom,
  (2) a plurality of paddle blades mounted on said support members,
   (a) each of said paddle blades in a first set of blades being attached to the distal ends of said support members adjacent to the inner surface of said shell, and
   (b) each of said paddle blades in a second set of blades being attached to said support members between said shaft and a paddle blade from said first set;
 (D) an outlet located in the other of said heads for discharging the resulting reaction products from said reactor;
 (E) a plurality of purge gas inlets disposed in each head of said reactor;
 (F) one other purge gas inlet connected to said outlet; and
 (G) pulsing means operatively connected to said purge gas inlets for pulsing a purge gas against the inner surface of each head to prevent the accumulation of reaction products thereon and for aiding in the removal of the reaction products from said reactor.

6. In combination a two-stage polymerization reactor system having first and second stage reactors in series, each of said reactors containing the same elements as the polymerization reactor of claim 5 wherein the outlet passageway of said first stage reactor is connected to the inlet passageway of said second stage reactor.

7. The polymerization reactor as in claim 5 wherein each of said paddle blades in said first set of blades are pitched to direct the flow of at least a portion of the material to be contacted toward said shaft.

8. The polymerization reactor as in claim 7 wherein each of said paddle blades in said second set of blades are pitched to direct the flow of at least a portion of the material to be contacted toward the inner surface of said shell.

References Cited

UNITED STATES PATENTS

| | | | |
|---|---|---|---|
| 2,627,668 | 2/1953 | Handwerk | 23—288.3 X |
| 2,630,302 | 3/1953 | Jones | 23—285 X |
| 2,677,000 | 4/1954 | Russum | 23—288.3 X |
| 3,071,352 | 1/1963 | McIntyre | 259—6 X |
| 3,254,070 | 5/1966 | Roelen | 23—285 X |
| 3,377,139 | 4/1968 | MacGregor | 23—285 |
| 3,386,809 | 5/1968 | Massoubre | 23—285 |

MORRIS O. WOLK, Primary Examiner

S. MARANTZ, Assistant Examiner

U.S. Cl. X.R.

23—252, 288; 34—33; 259—6; 260—94.9